(12) United States Patent
Baxter, III et al.

(10) Patent No.: US 7,672,303 B1
(45) Date of Patent: Mar. 2, 2010

(54) ARBITRATION METHOD AND SYSTEM

(75) Inventors: William F. Baxter, III, Holliston, MA (US); Stephen D. MacArthur, Northboro, MA (US); Man Min Moy, Holliston, MA (US); Brett D. Niver, Grafton, MA (US); Yechiel Yochai, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 938 days.

(21) Appl. No.: 11/059,885

(22) Filed: Feb. 17, 2005

(51) Int. Cl.
*H04L 12/28* (2006.01)
*H04L 12/56* (2006.01)

(52) U.S. Cl. ...................... 370/389; 370/412

(58) Field of Classification Search .......... 370/351–389
See application file for complete search history.

(56) References Cited

U.S. PATENT DOCUMENTS

| | | | | |
|---|---|---|---|---|
| 5,231,633 A | * | 7/1993 | Hluchyj et al. | 370/429 |
| 5,371,893 A | * | 12/1994 | Price et al. | 710/241 |
| 5,805,589 A | * | 9/1998 | Hochschild et al. | 370/389 |
| 5,892,766 A | * | 4/1999 | Wicki et al. | 370/412 |
| 6,452,903 B1 | * | 9/2002 | Peck et al. | 370/235 |
| 6,606,326 B1 | * | 8/2003 | Herring | 370/412 |
| 6,882,649 B1 | * | 4/2005 | Gura et al. | 370/395.42 |
| 6,975,626 B1 | * | 12/2005 | Eberle et al. | 370/358 |
| 6,980,552 B1 | * | 12/2005 | Belz et al. | 370/392 |
| 7,073,020 B1 | | 7/2006 | Black et al. | |
| 7,106,731 B1 | * | 9/2006 | Lin et al. | 370/389 |
| 7,245,586 B2 | * | 7/2007 | Bitar et al. | 370/235 |
| 7,440,454 B1 | * | 10/2008 | Goolsby | 370/389 |
| 2003/0035371 A1 | * | 2/2003 | Reed et al. | 370/230 |
| 2004/0085964 A1 | * | 5/2004 | Vaananen | 370/395.4 |
| 2006/0039370 A1 | | 2/2006 | Rosen et al. | |

OTHER PUBLICATIONS

U.S. Appl. No. 11/059,961, filed Feb. 17, 2005.
PCI Express Base Specification REV 1.0 Apr. 15, 2003, pp. 90-93 and 95-96.

* cited by examiner

*Primary Examiner*—Hong Cho
*Assistant Examiner*—Robert C Scheibel

(57) ABSTRACT

A method is provided for performing arbitration in an information packet controller. The method includes transmitting different types of information packets from an initiator to a receiver. One type of information packet has a quality of service requiring a faster transmission time from the initiator to the receiver than another type of information packet having a quality of service having a slower transmission time from the initiator to the receiver. The transmitting of the information packets from the initiator to the receiver is in accordance with priority assigned to the information packet, the quality of service assigned to the information packet, and the age of such information packets having been stored in a queue of the initiator, such quality of service being a function of the speed at which the packets are required to pass from the initiator to a receiver.

15 Claims, 13 Drawing Sheets

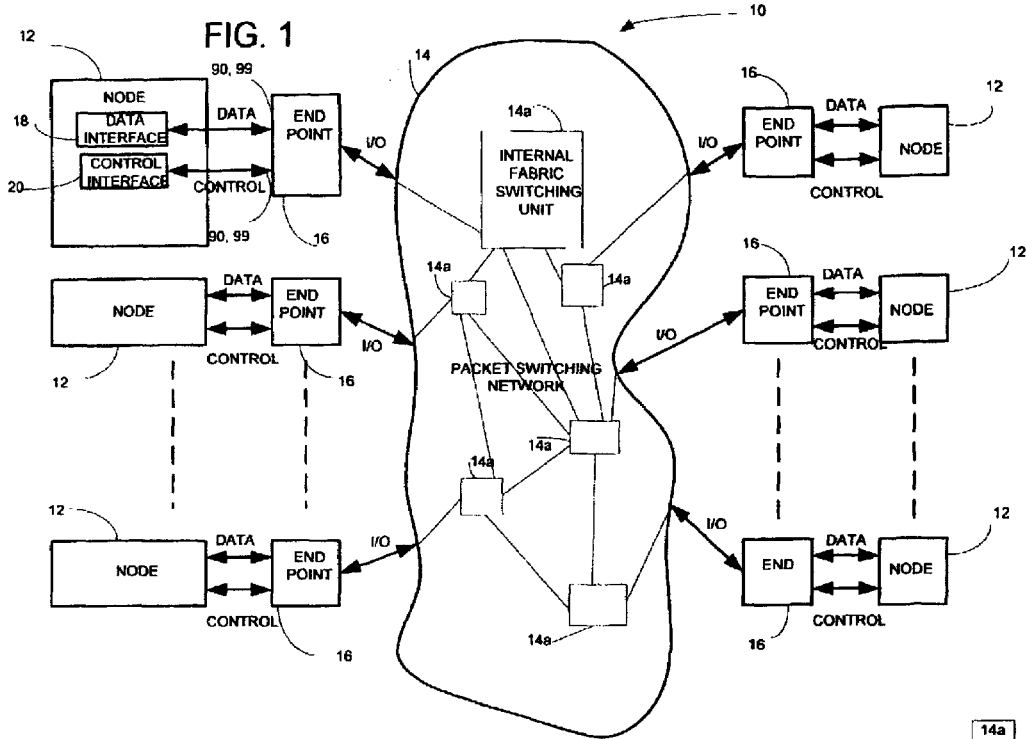

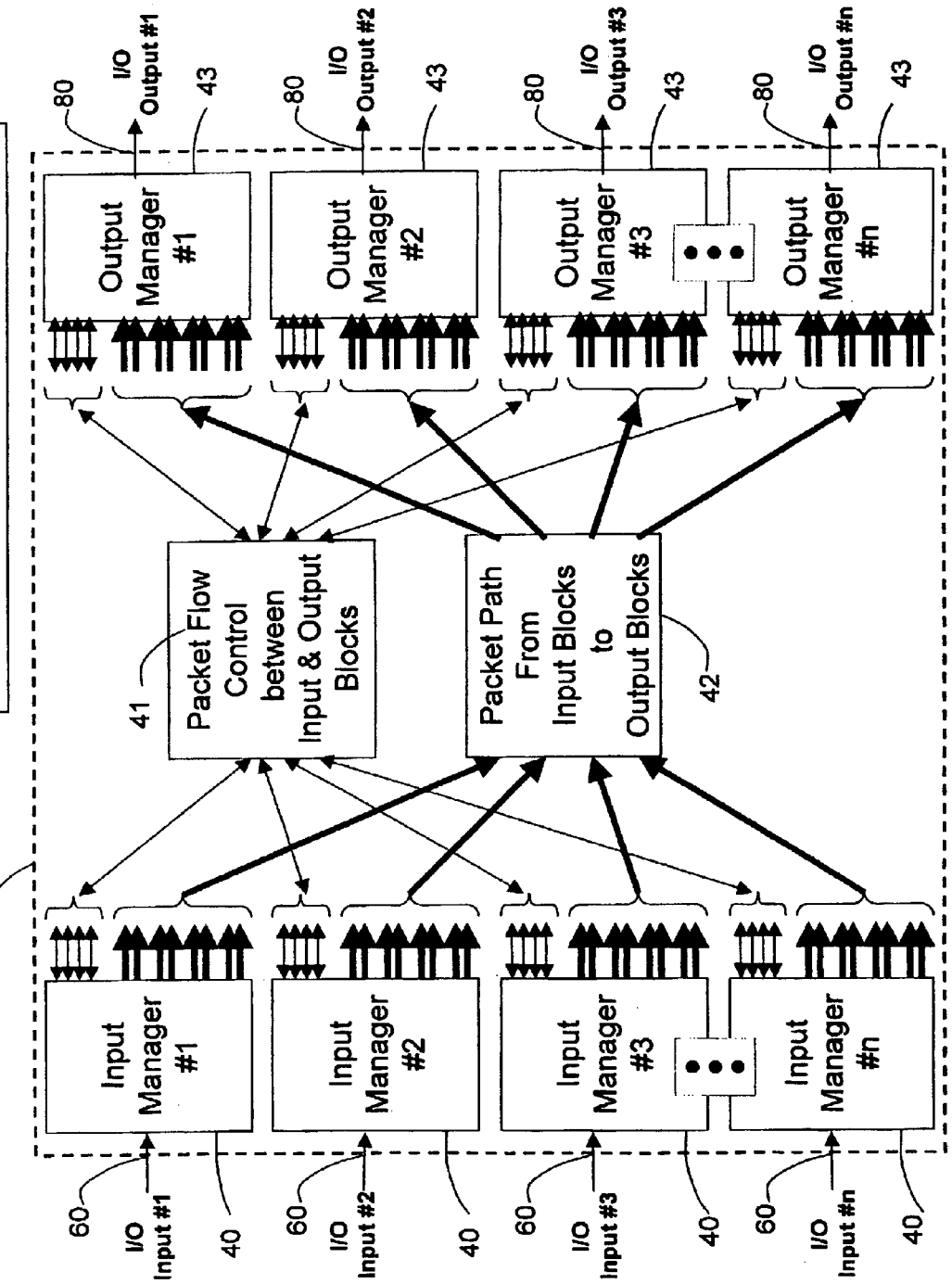
FIG. 3 Fabric Switch Unit 14a Block Diagram

Fabric Switch Unit 14a Paths

FIG. 5  Fabric End Point 16 Block Diagram

FIG. 7 Input Decoder 62 Processing

FIG. 8  Arbiter 66 selection process

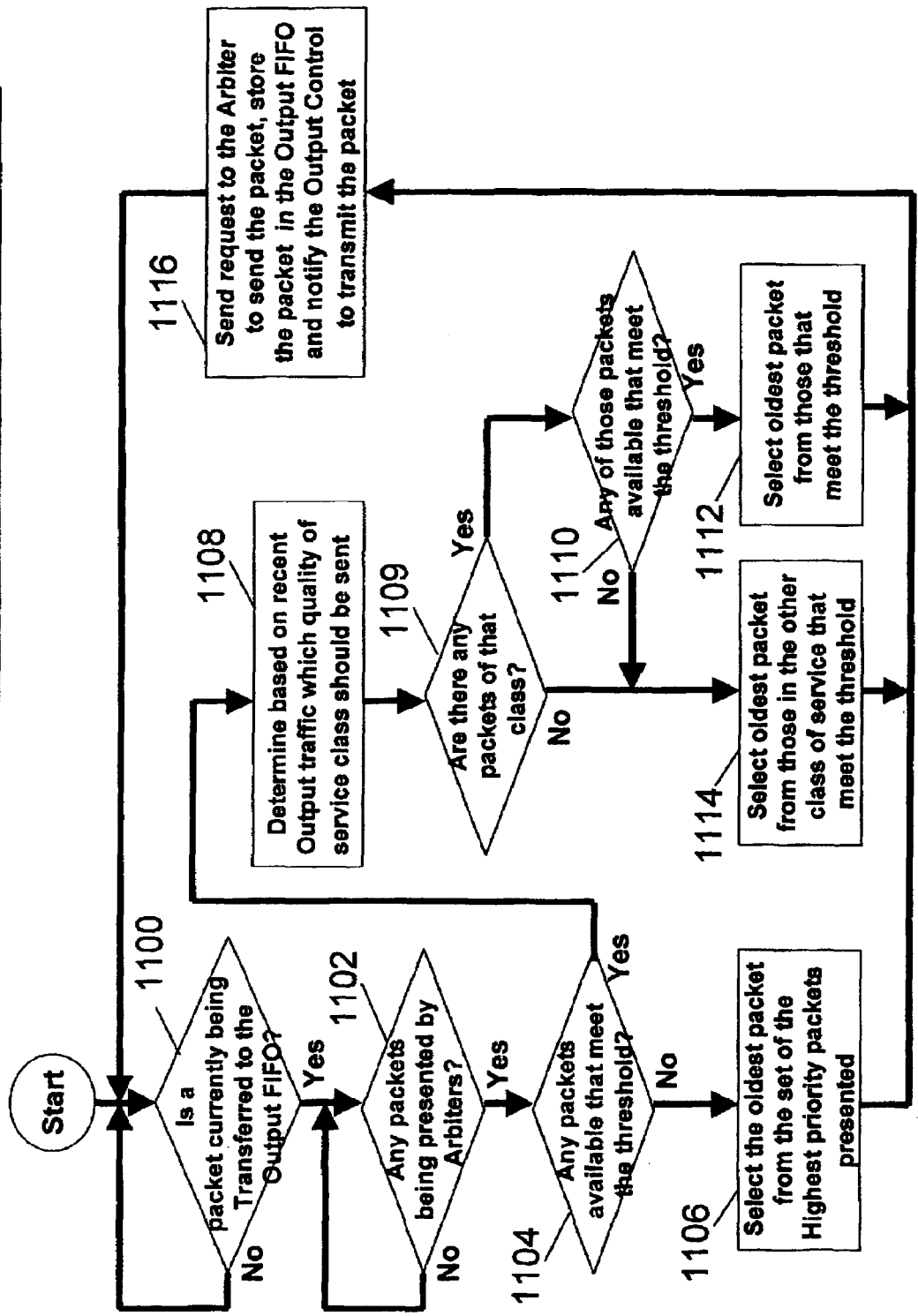
FIG. 11    Output Sequencer 71 Selection Flow

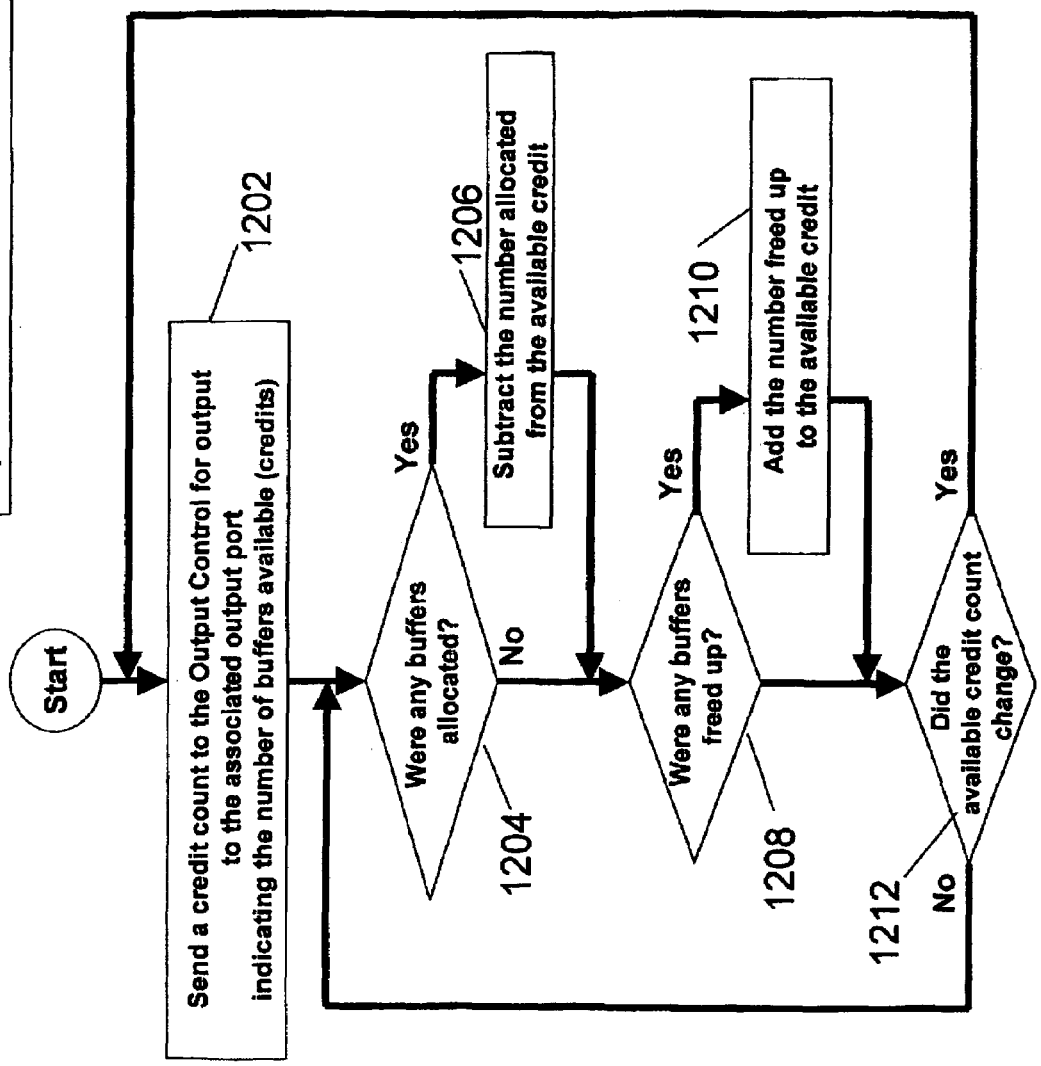
FIG. 12 Input Decoder 62 Buffer Management Flow

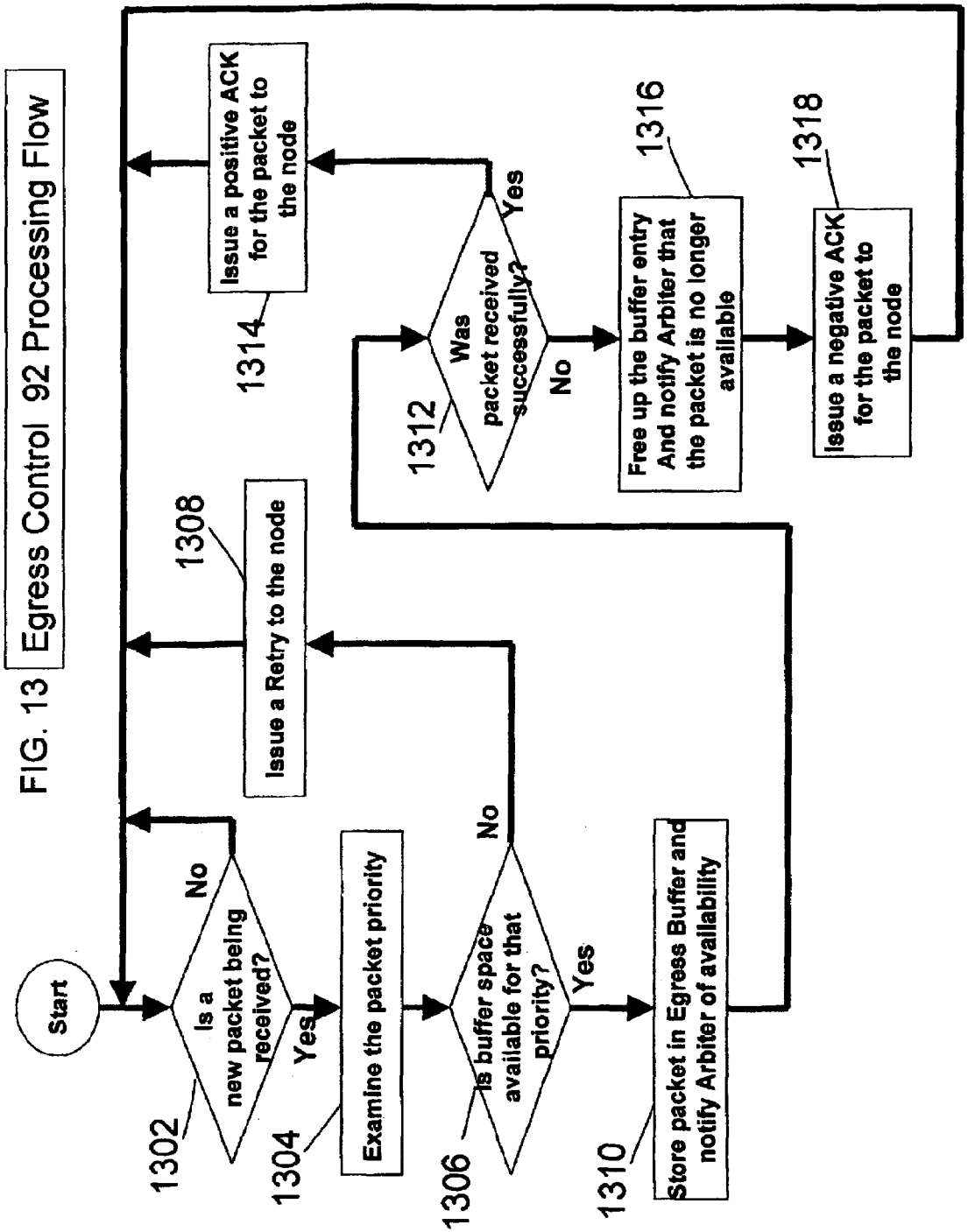
FIG. 13 Egress Control 92 Processing Flow

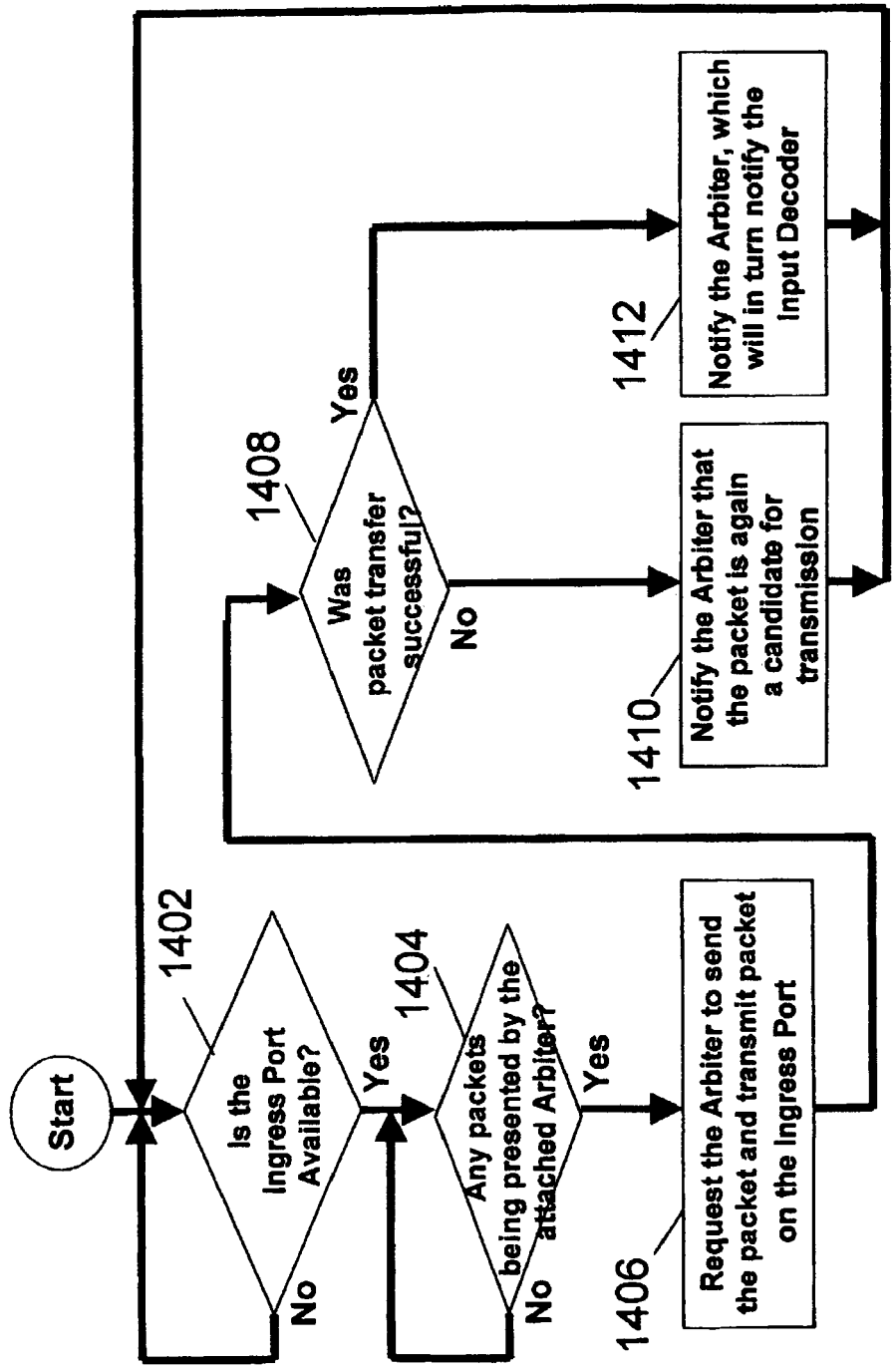
FIG. 14  Ingress Control 97 Selection Flow

ARBITRATION METHOD AND SYSTEM

TECHNICAL FIELD

This invention relates generally to arbitration system and methods and more particularly to methods and systems used in packet switching networks.

BACKGROUND

As is known in the art, packet switching networks typically include a plurality of interconnected internal fabric switching units. Nodes are connected to the network through external network end point controllers. Both the internal network switching units and end points are herein sometimes collectively referred to herein as information packet controllers.

There are typically two types of information packet controllers: a push-only type usually associated with unidirectional messaging, wherein packets arrive at a target information packet controllers (herein sometimes referred to as a target) in the order they are generated at a source information packet controllers (herein sometimes referred to as a source); and a request/response hardware based request/response protocol) type where a source initiates a request for service in the form of an associated response packet from the target, said response packets bypassing request packets. One such example of such an associated request/response type is a load/store protocol in which a load request is responded to by the target with the requested data as a response with a data payload, and a store is responded to by the target with a receipt response.

With the push only type, while all packets are transmitted to the target, some applications require that certain classes of packets be transmitted with a higher quality of service than other classes of packets. Push only information packet controllers support one or more classes of quality of service, as an example guaranteeing a minimum bandwidth allocation. Typically, push only information packet controllers transmit packets through network information packet controllers in the order in which they arrive, otherwise known as First-In, First-Out (FIFO) order within each class of quality of service. Since there is no associated hardware related response required there is no issue with hardware induced deadlock scenarios.

With the request/response type, requests are sent to the target from the source and priority given to the responses to bypass requests being transmitted through the network. This allows the delivery of anticipated responses to free up resources within the system needed for processing requests, thereby avoiding system failure due to deadlock.

However, since the higher priority packets are sent first, some low priority packets may be starved, i.e., may be not transmitted to, and hence not serviced by, the target. Typically, request/response capable networks will employ a scheme in which the packet contains a priority tag, often providing multiple levels of priority, while stipulating that the response associated with a given request must be of a higher priority than that request. Multiple levels of priority available for request packets offers a form of quality of service usually associated with delivery time. Packets are usually issued and promoted through the network in priority order, hence avoiding the aforementioned deadlock scenarios, but not supporting other quality of service considerations.

However, since the higher priority packets are sent first, some low priority packets may be starved, i.e., may not be transmitted to, and hence not serviced by, the target for extended periods of time. In the extreme, the presence of higher priority packets from one or more information packet controllers can cause lower priority packets from another information packet controller to never be transmitted.

As is also known in the art, there are two types of packet flow control: a receiver based flow control and an initiator based flow control. This flow control is employed at each connection, sometimes referred to as a link or bus, between information packet controllers within the network. Each information packet controller has one initiator and one receiver associated with each link to an attached other information packet controller. It is first noted that the receiver has only a limited number of locations for temporary storage of packet being transmitted. In the initiator based flow control, number of available locations is indented by a number of credits, communicated by the issuance by the receiver of Credit flow control packets.

With target based flow control, the initiator speculatively sends a packet to the receiver. The receiver advises the initiator to retry if the receiver is not able or does not wish to receive the packet sent to it by the initiator i.e., if the receiver is not ready or does not want the packet sent to it by the initiator the receiver replies by sending the initiator a Retry flow control packet. The retry may be sent by the receiver if the priority indication appended to the packet sent by the initiator is a priority lower than that desired by the receiver in view of the available storage at the receiver.

With initiator, based flow control the receiver informs the initiator as to the number of available storage locations, i.e., the number of credits. The initiator then determines the packet and number of packets to be sent to the receiver, reserving sufficient available locations to support sending higher priority packets.

As noted above, there are typically two types of information packet controllers: a push-only type and a request/response type. Push only type networks can leverage a scheme of promoting packets through the network based on the order of arrival, avoiding excessive service times while utilizing full bandwidth, meanwhile supporting different classes of service. With the request/response type, a prioritization is required. However since the higher priority packets are sent first, some low priority packets may be starved, i.e., may not be transmitted to, and hence not serviced by, the target. Note also that, unlike the push-only model where packets are promoted in arrival order independent of packet size, load/store packet sizes have a direct impact on the transmission performance characteristics of the network.

Request packets expecting a response data payload (e.g. load requests) are typically small in size, stipulating just enough information to locate or label the desired data and stipulate the data size to be transferred. The response packets with the requested data payload, in contrast, are of a size to satisfy the request, hence are typically much larger.

Request packets sending a data payload (e.g. store requests) are typically large in size to accommodate the data payload. In a guaranteed delivery network, typically request packets sending a data payload will be responded to by the target hardware by the sending of a receipt acknowledgement packet, with such associated hardware acknowledge response packet being very small.

Consider, for example, two interconnected of the information packet controllers wherein one information packet controller, (controller 1), has attached two controller sources (sourceA1 and sourceB1) and two target memory controllers (targetA1 and targetB1), and the other packet controller (controller 2), also has attached two packet controller sources (sourceA2 and sourceB2) and two target memory controllers (targetA2 and targetB2) in accordance with the following table:

| Controller 1 | Controller 2 |
|---|---|
| sourceA1 | sourceA2 |
| sourceB1 | sourceB2 |
| targetA1 | targetA2 |
| targetB1 | targetB2 |

In this example, each source is capable of issuing multiple outstanding load or store requests (segments of larger transfers) at information packet controller link interconnect rates. The two sources (sourceA1 and sourceB1) on packet controller 1 start first, queuing up (small) priority 0 load requests in a packet controller-to-packet controller input buffer in packet controller 1, which then streams to packet controller 2's input buffer, and hence to packet controller 2's memory controllers (targetA2 and targetB2). Memory controllers targetA2 and targetB2 then establish a stream of (large) priority 1 data payload packets back through a packet controller-to-packet controller input buffer in packet controller 2, and hence through packet controller 1's input buffer and on to sourceA1 and sourceA2. The limit in this case will be the available packet controller to packet controller link bandwidth. Assume that the responses in the packet controller-to-packet controller input buffer in packet controller 1 are being sent to the two requesters in parallel, such that the packet controller-to-packet controller input buffer in packet controller 1 never fills up. Then the two requesters on packet controller 2 start issuing (small) priority 0 load request packets. These two request streams are now competing for the packet controller 2 output port. According to network protocols as exemplified by the Serial Rapid I/O Specification which impose strict priority based arbitration, the packet controller 2 output port will always service the highest priority requester. There will always be at least one memory controller with a priority 1 packet waiting. As a consequence, the requesters on packet controller 2 will never get any priority 0 requests out the packet controller 2 output port onto the packet controller-to-packet controller link, even though the packet controller to packet controller input buffer in packet controller 1 could accept them. Note that although the link from packet controller 2 to packet controller 1 is fully utilized, the throughput on the link from packet controller 1 to packet controller 2 only uses a fraction of the available bandwidth proportional to the size of the request packets to the size of the response packets. The disadvantage of always promoting the highest priority packets available is that it lowers throughput and causes starvation (i.e., lack of service) of lower priority packets resulting in either lack of service or excessive latencies of services.

SUMMARY

In accordance with the present invention, a method is provided for performing arbitration in an information packet controller. The method includes transmitting different types of information packets from an initiator to a receiver. One type of information packet has a quality of service requiring a faster transmission time from the initiator to the receiver than another type of information packet having a quality of service having a slower transmission time from the initiator to the receiver. The transmitting of the information packets from the initiator to the receiver is in accordance with priority assigned to the information packet, said quality of service assigned to the information packet, and the age of such information packets having been stored in a queue of the initiator, such quality of service being a function of the speed at which the packets are required to pass from the initiator to a receiver;

With such an arrangement a method and system are particularly suitable for use in a request/response or request/response capable packet switching network for resolving low priority request/response packets from starvation (i.e., not being serviced) to thereby achieve all of the following:

a. Utilize Full/maximum bandwidth of the network;

b. Reduce excessive service times for lower priority packets; and c. Support network traffic requiring different classes of service; while guaranteeing responses can, when necessary, bypass requests to avoid deadlock. In one embodiment, the information packets are of a plurality of different types, and wherein the priority is assigned as a function of a corresponding one of the information types.

In one embodiment, the information packets are of a plurality of different classes of service, and wherein the class is assigned as a function of a corresponding one of the information types.

In one embodiment, the information packets are of a plurality of different classes of service, and wherein the class is assigned as a function of a corresponding range of priorities.

In one embodiment, the information packets are transmitted based on a threshold value, such value being based upon available storage credits as communicated by the receiver.

In one embodiment, the information packets are transmitted based on a threshold value, such value being calculated by the initiator based upon retry notifications sent by the receiver.

In one embodiment, a method is provided for performing arbitration in an initiator information packet controller. The method includes: storing information packets in one or more internal quality of service queues of the initiator and indicating a relative age among such stored packets, such quality of service being a function of the speed (i.e. latency) at which the packets are required to pass from the initiator to a receiver; assigning to each one of the packets a priority; and transmitting packets to the receiver as a function of the priority, quality of service, and relative age.

In one embodiment, an information packet controller is provided having: an output port; and, an output port manager to perform arbitration for transmission of information packets to the output port in accordance with such arbitration, such processing being the determination of order of: transmittal of information packets from the output of an information packet controller to a receiver in accordance the priority assigned to the information packet, with a class of service assigned to the information packet, and the age of such information packets that have been stored in one or more queues of the information packet controller.

With such arrangements, starvation or blockage to lower priority packets is avoided, and overall system performance is improved for certain packet transmission patterns compared to a strict priority scheme as exemplified by the Rapid I/O specification is provided. In addition, a quality of service scheme can be imposed, associated with either bandwidth or time to service, without incurring the potential of network deadlock.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a diagram of a packet switching system according to the invention;

FIG. 2 is a block diagram of a pair of interconnected information packet controllers used in the system of FIG. 1, one being a fabric end point and the other being a fabric switching unit, such controllers having a packet flow manager therein for performing an arbitration for packet transmission order in accordance with the invention;

FIG. 3 is a block diagram of an exemplary one of the fabric switching units of FIG. 2;

FIG. 11 is a flow diagram of the process used by output port managers of information packet controllers FIG. 2 to select the order for packet transmission for packets presented by the plurality of input port managers;

FIG. 12 is a flow diagram of the process used to control transmission of packets into the input port manager of information packet controllers of FIG. 2 in accordance with the invention;

FIG. 13 is a flow diagram of the process of controlling the transmission of packets into the end points of the network from the fabric nodes of FIG. 2 in accordance with the invention; and FIG. 14 is a flow diagram of the process of controlling the transmission of packets from the network end points to the fabric nodes of FIG. 2 in accordance with the invention.

Like reference symbols in the various drawings indicate like elements.

DETAILED DESCRIPTION

Figure 4:
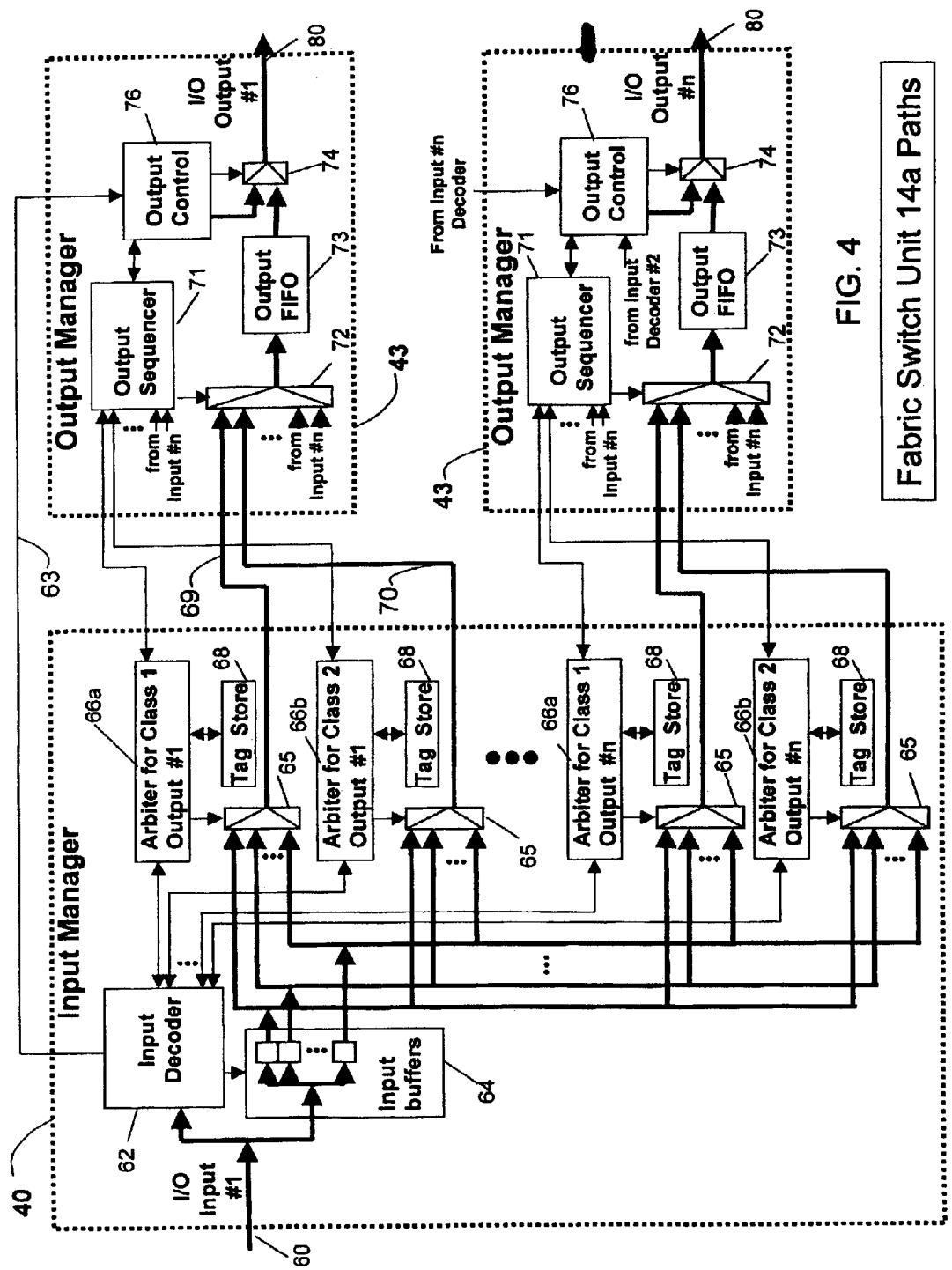
FIG. 4 is a block diagram of the exemplary one of the fabric switching units of FIG. 2, such diagram showing packet and internal communications paths within such fabric switching unit.

Referring now to FIG. 1 a packet switching system packet switching system 10 is shown having a plurality of nodes 12, each one of the nodes 12 being coupled to a packet switching network 14 having a plurality of interconnected fabric switching units 14a through a corresponding one of a plurality of end point controllers 16. In this embodiment, each one of the nodes 12 is adapted to transmit independently to the fabric switching network 14 two different types of information packets.

In addition, communications and packet flow control also are transmitted between information packet controllers (i.e. fabric switching networks 14a or end points 16) using flow control packets. Flow control packets do not have any priority value information, they have precedence over information packets, and they are only destined to the directly attached information packet controllers. In this description packets are assumed to refer to information packets unless otherwise explicitly denoted as flow control packets.

Here, one type of information packet is a Data information packet and the other type is a Control information packet. The nodes 12 include a DATA interface 18 for transmitting and receiving the Data information packets and a CONTROL interface 20 for transmitting and receiving the Control information packets. The Control information packet type represents one class of quality of service, herein sometimes referred to as class 1, requiring a faster time (i.e. low latency) through the packet switching system 10 than the Data information packet type which represents a different class of service, herein sometimes referred to as class 2, achieving proper system performance with a slower time through the packet switching system 10. Thus, Control information packet type must pass through the system faster than Data Information packet types.

Both information packet types traverse the same switching network 14. As noted above, each one of the nodes 12 is adapted to transmit independently to the packet switching network 14 the DATA information packets and the CONTROL information packets. That is, the DATA interface 18 and the CONTROL interface 20 operate independently of one another. Thus, Data information passes to and from the DATA interface 18 via a bidirectional DATA bus and Control information passes to and from the CONTROL interface 20 via a bi-directional CONTROL bus.

As noted above, each one of the end points 16 and fabric switching units 14a is referred to as an information packet controller. An exemplary end point 16 and packet switching unit 14a is shown in FIG. 2. It should be understood that the packet flow control in each one of the end points 16 and switching units 14a operates under the same principles, and will be described in more detail below in connection with FIGS. 3 through 11 inclusive.

It is also noted that while each end point 16 typically will have one bidirectional I/O port (i.e., an input port 60 and an output port 80), each switching unit 14a typically has a plurality of bi-directional I/O ports (i.e., an input port 60 and an output port 80) only one of switching unit 14a I/O ports being described in detail herein.

The end point 16 and fabric switching unit 14a will be described in more detail in connection with FIGS. 5 and 6, and FIGS. 3 and 4, respectively.

It is first noted that both the fabric switching unit 14a and end point 16 include an Input Manager 40 and Output Manager 43. These managers are identical in configuration and exemplary ones thereof will be described in more detail in connection with FIG. 4. Suffice it to say here that Input Manager 40 of end point 16 is responsive to flow control signals from the fabric switching unit 14a coupled thereto. The Input Manager 40 supplies flow control signals to the Output Manager coupled thereto.

The end point 16 also includes a class 1 Egress and class 2 Egress Managers 50 fed by Control information packets and Data information packets, respectively, from the CONTROL interface 20 and the DATA interface 18, respectively, of the node 12 coupled thereto.

The end point 16 also includes an Output Manager 43, to be described in more detail in connection with FIG. 4. Suffice it to say here that the Output Manager 43 issues flow control packets at port 80 of such end point 16.

The end point 16 also includes a class 1 Ingress and class 2 Ingress Managers 53 for coupling Control information packets and Data information packets, respectively, to the switching unit 14a coupled thereto. The interconnections between the Input Manager 40, Output Manager 43, Egress Managers 50 and Ingress Managers 53 will be described below in connection with FIG. 5.

Referring now to FIG. 3, the fabric switching unit 14a is shown to include a plurality of I/O busses. As noted above, each bus is comprised of a transmitter I/O Output Port 80 and an associated receiver I/O Input Port 60. Although for illustration purposes only one I/O Input port 60 is shown and two I/O Output Ports 80 are shown in FIG. 3, it is to be understood that the fabric switching unit 14a will have exactly one Input Port and one Output Port for each of the plurality of I/O busses connecting to other information packet controllers (FIG. 1). Each I/O Input Port 60 is controlled by an associated Input Manager 40. Similarly, each I/O Output Port 80 is controlled by an associated Output Manager 43.

In this embodiment, Data information packets and Control information packets are transmitted through the fabric switching unit 14a under control of the receiving port's Input Manager 40 in cooperation with the intended target I/O Output Manager 43, such information needed to route packets from input to output being provided in the packet content. Communications between Input Manager 40 and targeted Output Manager 43 is through a fully connected matrix of packet flow control Communication Paths 41. Under the coordinated control of the plurality of Input Managers 40 and Output Managers 43, to be described in more detail in connection with FIG. 4, Data and Control information packets arriving at the plurality of inputs are transmitted through the fully connected Information Packet Path 42 matrix independently and in parallel as dictated by the availability each of the I/O Output ports 43.

Referring now to FIG. 4, each of the I/O Input Managers 40 includes an input port Packet Decoder 62 which controls a set of Input Buffers 64, as well as a plurality of pairs of input Arbiters 66a, 66b. For each of the Output Managers 43, there is a separate pair of input Arbiters 66a, 66b, one for each of the different classes of quality of service. Thus, here arbiter 66a is for class 1 (i.e., Control information packets) and arbiter 66b is for class 2 (i.e., Data information packets)). Each one of the Arbiters 66a, 66b is responsible for selection of an information packet contained in the set of Input Buffers 64, i.e., the packet to be presented to the attached Output Manager 43. Each one of the Arbiter 66a, 66b has a dedicated Tag Store 68 which contains a list of information packets from which it selects. Each Arbiter 66a, 66b controls a multiplexer 65 to provide a path for the selected packet to the attached Output Manager 43.

It is noted that there is a plurality of I/O Output Managers 43, each including an I/O Output Control 76 to control the issuance of information packets and flow control packets onto the I/O Output Port 80. Each I/O Output Manager 43 includes an Output Sequencer 71 to determine the order of issue of the packets being presented by the attached Arbiters 66a, 66b. The Sequencer 71 works in conjunction with an Arbiter 66a, 66b to transfer a selected packet from an entry in the Input Buffers 64, through the Arbiter's multiplexer 65, through the Sequencer's multiplexer 72 and into the Output FIFO 73.

It should be noted that for each of the pair of associated I/O Input and I/O Output ports comprising one I/O bus, there is a direct communication path 63, connecting the Input Decoder 62 and the Output Control 76 such that the Input Decoder 62 can issue requests to the Output Control 76 for the creation and transmission of I/O bus level flow control packets. These packets will be interjected between information packets being transmitted on the I/O Output Port 80. This injection of flow control packets in the stream of information packets is supported by the inclusion of the information packet Output FIFO 73.

It should be noted that for each I/O Output Manager 43 there are Information Packet Paths 69,70 for information packets from the Input I/O Manager 40 associated with that I/O bus. While this path is not necessary for the correct operation of the fabric switching unit, it provides a convenient ability to loop back packets to the sender for test purposes.

The Input Decoder 62 is responsible for interrogating incoming packets from the I/O Input Port 60. It initially identifies them as either flow control packets or information packets. Flow control packets are forwarded to the Output Control 76 of the associated I/O Output Port 80 via the aforementioned direct communication path 63. Packets identified by the Input Decoder 62 as information packets are first examined to find if there is an available buffer entry in the Input Buffers 64, as determined by a comparison of the packet priority with the number of available credits as previously described. In the event that the Input Decoder 62 determines that there is insufficient space for the information packet, the Input Decoder 62 notifies the associated I/O Port Output Control 76 via the direct communication path 63 to create and issue a Retry flow control packet on the I/O Output Port 80. If there is sufficient buffer space, the Input Decoder 62 selects an available buffer entry in the Input Buffers 64 and places the information packet in the buffer. The Input Decoder 62 then informs the associated Output Control 76 to create and issue a packet acknowledge flow control packet on the I/O Output Port 80.

Upon a successful receipt and storage of the information packet, the Input Decoder 62 then, having identified the packet's targeted I/O Output Manager 43 and quality of service as indicated in the packet content, notifies the appropriate one of the Arbiters 66a, 66b connected to the targeted Output Manager 43 of the availability of the packet for selection. It should be noted that to achieve minimum latency in transmission of a packets from Input Port 60 to Output Port 80, that the Input Decoder may notify the Arbiter 66a, 66b of the availability of the packet prior to the packet being completely stored in the Input Buffers 64. Similarly, the Sequencer 71 and Output Control 76 may initiate packet transmission on the Output Port 80 prior to the arrival of the complete packet.

As previously noted, the Arbiter 66a, 66b is responsible for the selection of a packet stored in the Input Buffers 64 for presentation to the attached Output Manager 43. To this end the Arbiter 66a, 66b maintains a list of the available packets for selection, which resides in the Tag Store 68. The Arbiter 66a, 66b makes the selection based on the list content and information it receives from the Sequencer 71. In this embodiment, the Tag Store list entries consist of:

a) Time of arrival of the packet,
   b) Packet priority (derived from packet content),
   c) Location of packet in Input Buffers 64, and
   d) Status (invalid, valid awaiting transfer, or transferred awaiting acknowledge)

As previously noted, the Arbiter 66a, 66b also bases its selection on information it receives from the Sequencer 71. This information specifies the lowest priority packet that can be expected to be accepted by the information packet controller connected to that Output Port 80. This is herein referred to as the threshold value. Each Sequencer 71 generates a separate threshold value and communicates that value to all of the Arbiters 66a. 66b it connects to. This threshold value can be calculated from information supplied in the form of credits from initiator based flow control information, or can be calculated by the Sequencer 71 in the event that the attached information packet controller is operating in receiver based flow control mode using retry packets.

While in some embodiments the quality of service is presented directly in the packet content, in this embodiment the quality of service is embedded in and implied by the packet priority, understood by convention. It is noted that in this example there are four priorities, the lowest priority is 0 and the highest 3. Further, here CONTROL information request packets are assigned a priority 2 and CONTROL information response packets are assigned a priority of 3 while DATA information request packets are assigned a priority of 0 and DATA information response packets are assigned a priority of 1.

Figure 7:
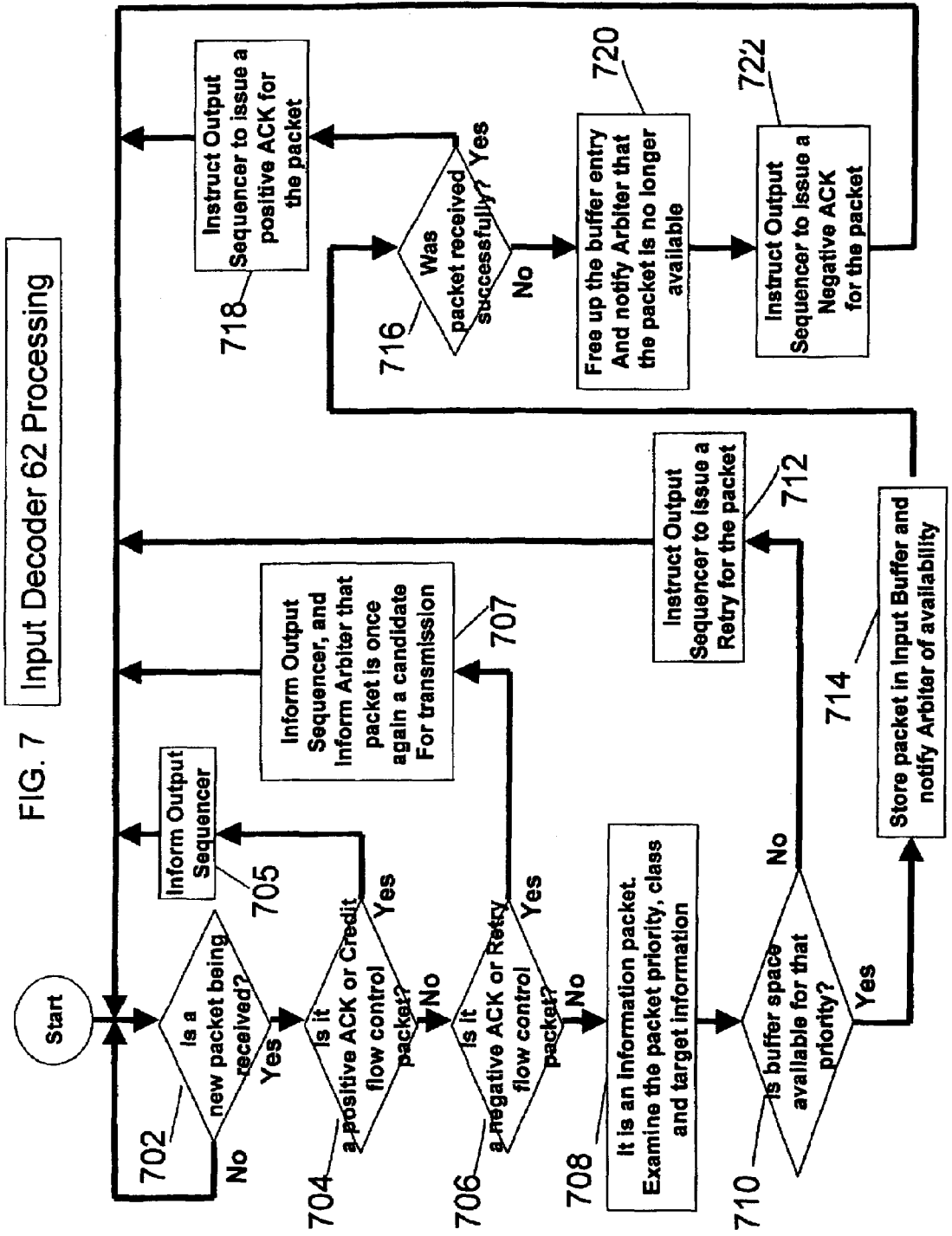
FIG. 7 is a flow diagram of the process used by input port managers of information packet controllers of FIG. 2 to decode and parse incoming packets.

Referring now to FIG. 7, the Input Decoder 62 awaits the arrival of information and flow control packets on the I/O Input Port 60, STEP 702. Upon a packet being received, the Input Decoder 62 examines the packet to determine if it is a flow control packet indicating positive ACK or Credit, STEP 704. If the packet being received is one of the said flow control packet types, the Input Decoder 62 will inform the associated Output Control 76 via the dedicated communication path 63 of the flow control packet content, STEP 705. This information is communicated to and used by the Output Sequencer 71 to calculate the threshold value, to be described in connection with FIGS. 9 and 10. Suffice it to say here that if the packet being received is one of either a negative acknowledge or Retry flow control packet types, STEP 706, the Input Decoder 62 will, in addition to informing inform the associated Output Control 76 via the dedicated communication path 63 of the flow control packet content, also inform the appropriate Arbiter 66a, 66b that the packet is a candidate for retransmission, STEP 707. If in STEP 704 and STEP 706 the packet is not identified as a flow control packet, then since it is an information packet, the Input Decoder 62 proceeds to examine the priority of the packet, quality of service class of the packet, and based on the target information contained within the packet and a predefined knowledge of the network topology, identifies the appropriate Arbiter 66a, 66b responsible for transmission, STEP 708.

The Input Decoder 62 then proceeds to ascertain if there is sufficient buffer space available in the Input Buffers 64, in compliance with the aforementioned buffer allocation by priority, STEP 710. If there are insufficient buffer entries, the Input Decoder 62 instructs the Output Control 76 to issue a retry for the packet being received, STEP 712. If buffer space is available for that priority packet, the Input Decoder 62 stores the packet in the Input Buffers 64, and informs the identified Arbiter 66a, 66b of the packet availability and attributes, STEP 714. The Input Decoder 62 determines if the packet was received in its entirety error free, STEP 716. If it was received successfully, the Input Decoder 62 instructs the Output Control 76 to issue a positive acknowledge for the packet, STEP 718. If there was an error in packet receipt, the Input Decoder 62 frees up the buffer entry and notifies the identified Arbiter that the packet is not valid and not available for transmission, Step 720. The Input Decoder 62 proceeds to instruct the associated Output Control 76 to issue a negative acknowledge for the packet, STEP 722. The Input Decoder returns to waiting for the next packet, STEP 702.

Figure 8:
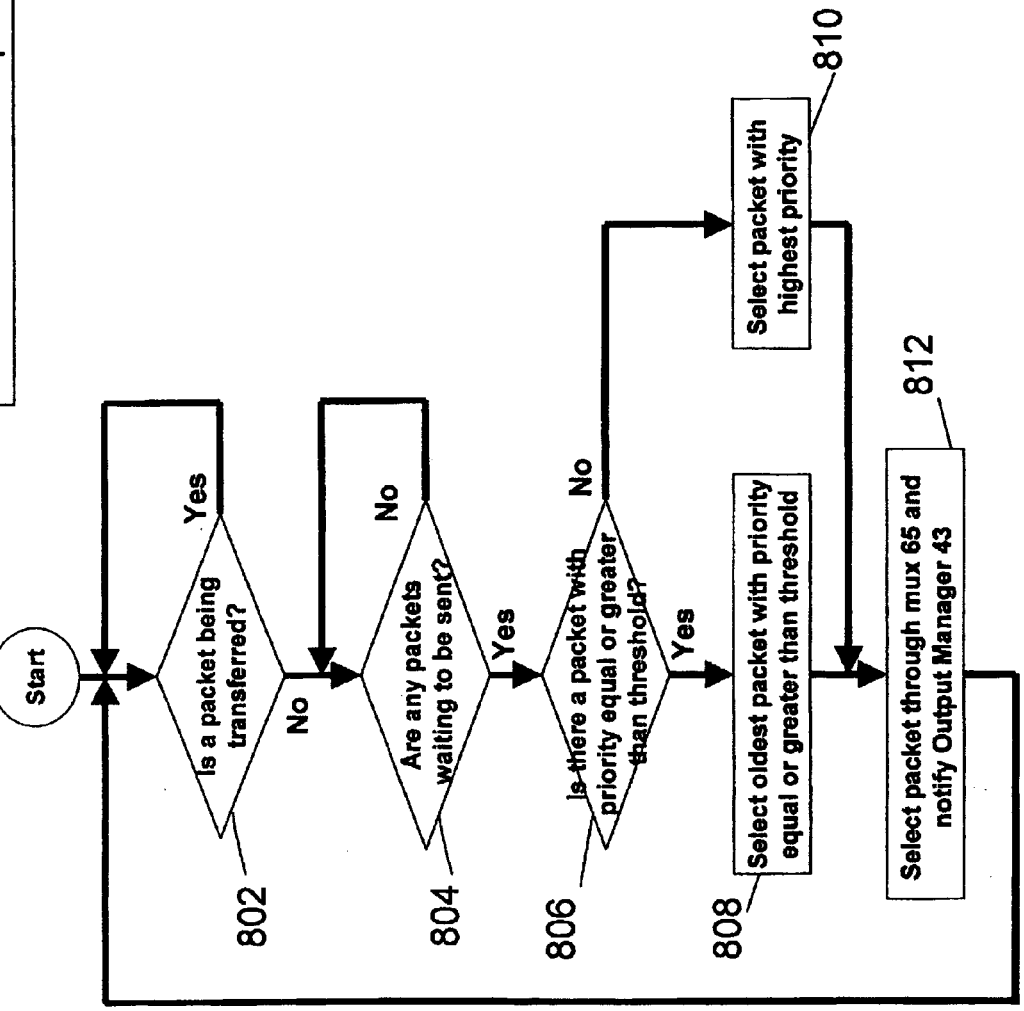
FIG. 8 is a flow diagram of the process used by input port managers within the information packet controllers of FIG. 2 to select candidate packets to be presented to targeted output port managers.

FIG. 8 denotes the method employed by the Arbiter 66a, 66b to select a packet for presentation to the Output Manager 43. No changes are made to packet selection if a packet has already been presented and is in the process of being transferred, STEP 802. When no packet is being transferred, the Arbiter 66a, 66b determines if there are one or more packets waiting for transmission as indicated by the packet list in the Tag Store 68, STEP 804. If there are no packets waiting to be transmitted, the Arbiter 66a, 66b will wait for the Input Decoder 62 to inform the Arbiter 66a, 66b of the availability of a packet. If there are one or more packets waiting, the Arbiter 66a, 66b determines if any of the candidate packets have an associated priority attribute equal to or greater than the current threshold provided by the Output Sequencer 71, STEP 806. If there are no packets that meet this criteria the Arbiter 66a, 66b selects the oldest one of the highest priority packets available, that being the packet that is most likely to be accepted by the information packet controller connected to the Output Port 80, STEP 810. If there is one or more packets that meet the threshold criteria, the Arbiter 66a, 66b will select the oldest packet with priority equal to or greater than the threshold value, Once the appropriate packet has been selected, the Arbiter 66a, 66b determines the location of the packet within the Input Buffers 64 as described from the packet attributes in the Tag Store 68. Using this location information, the Arbiter 66a, 66b makes the appropriate selection of the multiplexer 65, and notifies the Output Sequencer 71 of the availability of the packet, STEP 812. It should be noted that the relevant information contained in the Tag Store 68 is communicated to the Output Sequencer 71 to aid in the final selection of the next packet to be transmitted on the I/O Output Port 80. The packet may or may not be transferred at the discretion of the Output Sequencer 71.

As described earlier, the Output Manager 43, and more specifically the contained Output Sequencer 71, calculates the threshold value for that I/O Output Port 80. Dependent on whether the Output Port 80 is operating in an initiator or target flow, control, the Output Sequencer 71 will employ one of two different methods to calculate the threshold value.

Figure 9:
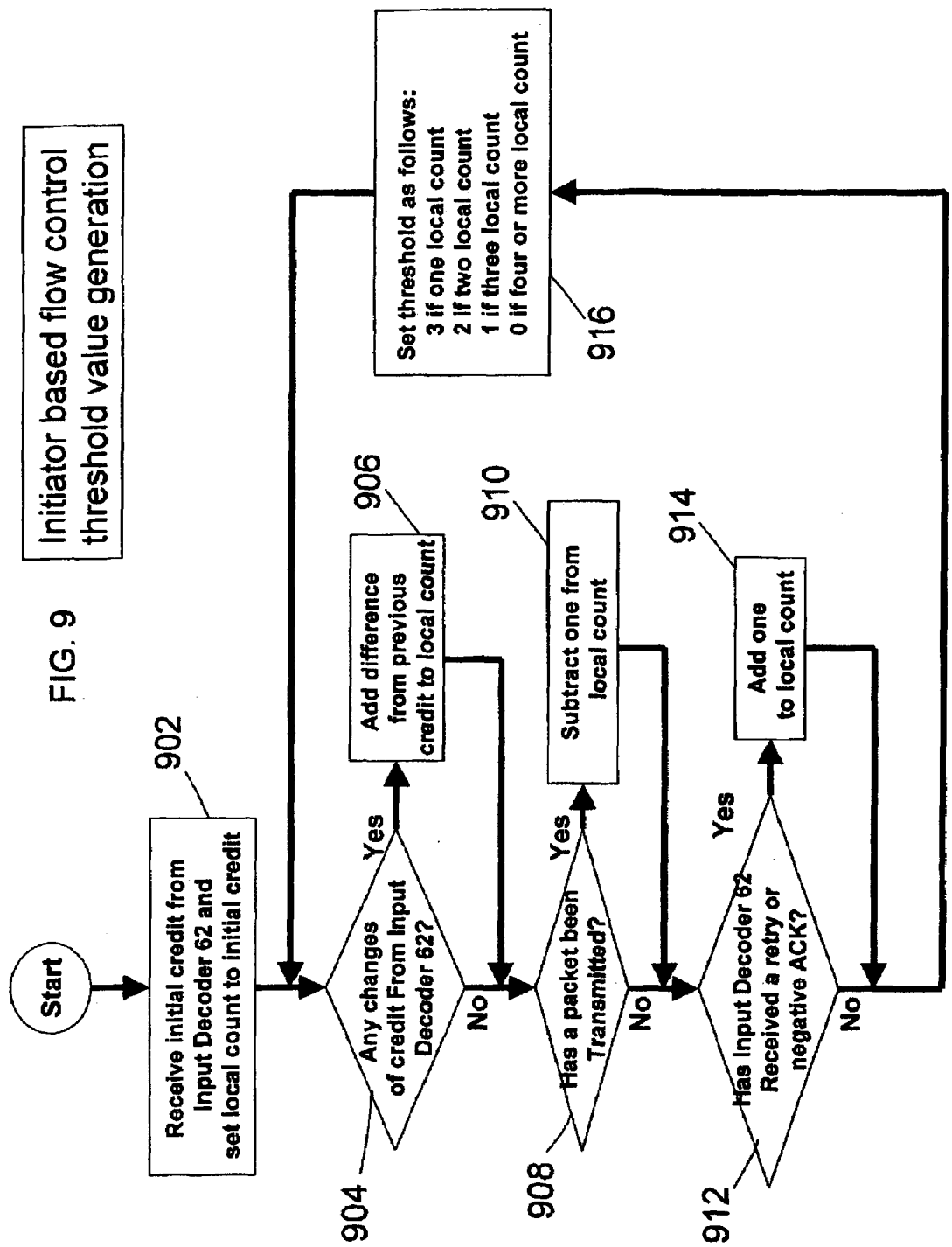
FIG. 9 is a flow diagram of the process used by the input port managers within the information packet controllers of FIG. 2 to prioritize packets for transmission in accordance with the invention.

Referring now to FIG. 9, when the attached information packet controller is operating in initiator based flow control, an initial buffer credit is communicated by the information packet controller connected to the I/O Output Port 80. This initial buffer credit is received by the associated I/O Input Port 60, and communicated to the Output Sequencer 71 via the dedicated communication path 63. The Output Sequencer 71 uses this initial buffer credit to calculate a local buffer count, STEP 902. This initial buffer count represents the maximum number of packet buffers the attached information packet controller has available. The Output Sequencer 71 will monitor the flow control information presented by the Input Decoder 62, and the packet transmission information provided by the Output Control 76 to adjust the local count, STEPS 904, 908 and 912. It should be noted that the local count represents the actual number of available packet buffers after having taken into consideration packets that have been transmitted but not yet accounted for via an update of the buffer credit from the attached information packet controller. Notification of changes of credit from Input Decoder 62, STEP 904, represent buffers previously consumed that have been freed up by the attached information packet controller. The local count is updated based on this information, STEP 906. Packets transferred prior to a credit update, STEP 908, decrement the local count, STEP 910. Packets that are rejected by the attached information packet controller, as notified by the Input Decoder 62. STEP 912, by implication free up free up buffers, and the local count is adjusted accordingly, STEP 914. Each time the local count changes, the threshold value must be recalculated. To ensure forward progress of transmission of packets through the network and hence avoid deadlock, an information packet can only be accepted by an information packet controller if there is at least one buffer available for a higher priority packet unless the packet being transmitted is of the highest priority. In this embodiment only one buffer entry is reserved for each higher priority above priority 0, so the threshold is calculated as follows, STEP 916:

| Local Count: | Priority Threshold Value: |
|---|---|
| 1 | 3 |
| 2 | 2 |
| 3 | 1 |
| 4 or more | 0 |

It should be noted that the threshold is continuously being evaluated for update, and there is no implied passage of time between STEPS.

Figure 10:
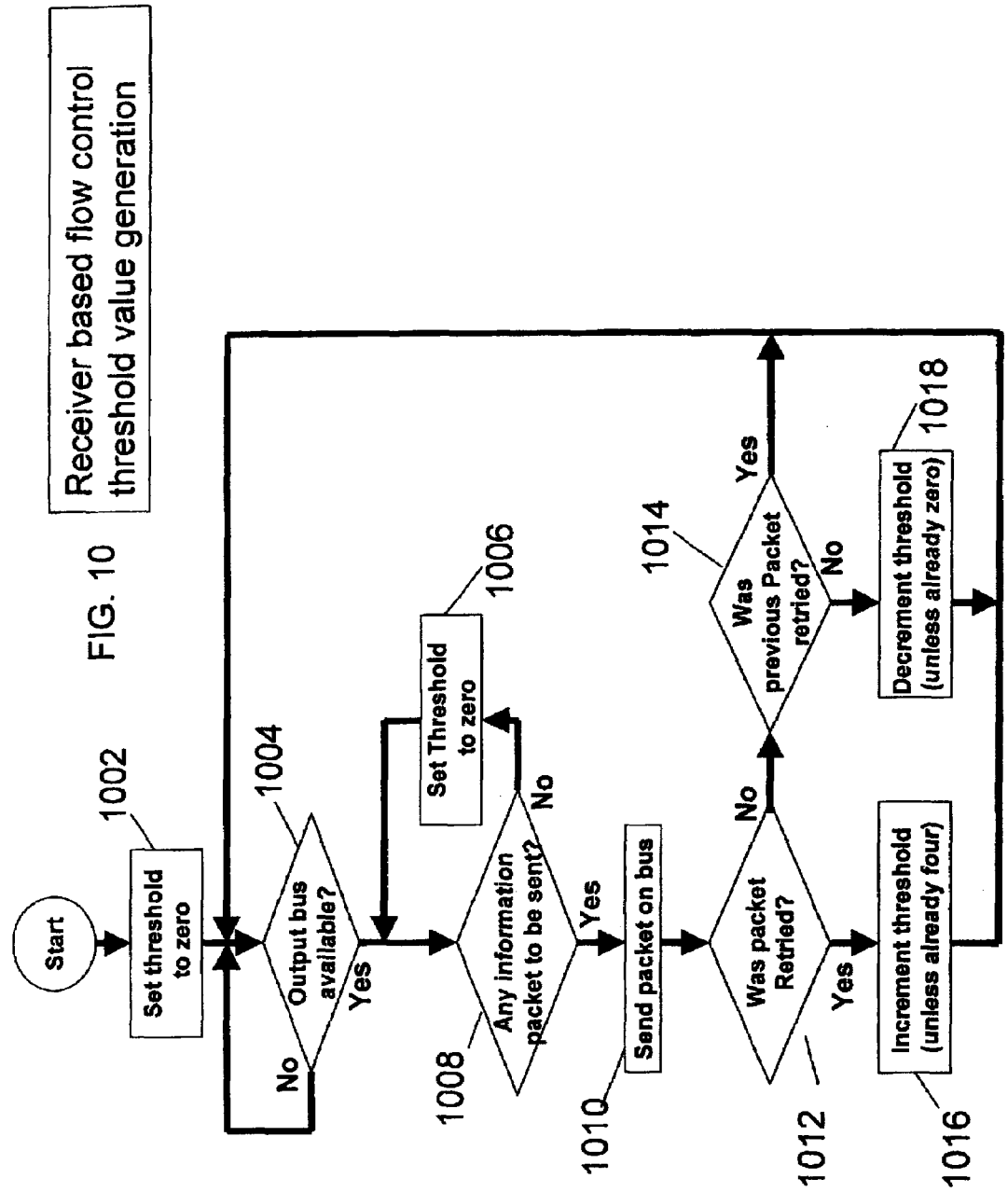
FIG. 10 is a flow diagram of the process used by input port managers within the information packet controllers of FIG. 2 to prioritize packets for transmission in accordance with the invention.

When the attached information packet controller is operating in target flow control mode, the threshold value must be inferred from the packet retry behavior of the attached information packet controller. Referring now to FIG. 10, the target is assumed to be initially capable of accepting any priority packet, STEP 1002. While the Output Port 80 is in use transferring an information or flow control packet, no changes are made to the calculated threshold value, STEP 1004. If the Output Port 80 is not currently transmitting information or flow control packets, but there is no packet available for transmission, the threshold value will be reinitialized to 0, allowing the next available packet, irrespective of priority, to be opportunistically transmitted to the attached information packet controller, STEP 1006. Once a packet is available and has been transmitted, STEP 1010, the Sequencer 71 notes the response from the attached information packet controller, as communicated by the Input Decoder 62. If the packet has been retried, STEP 1012, the attached information packet controller is assumed to have insufficient buffer space for that priority packet, and the threshold value, assuming it is not already at the maximum value, is incremented, STEP 1016. If the packet was accepted by the information packet controller, there is that potential that the attached information packet controller has freed up sufficient buffer space to also accept lower priority packets, and that the assumed threshold value may be higher than necessary. The likelihood that this condition does exist increases with the number of consecutive packets accepted, hence in this embodiment the Sequencer 71 determines if the previously transmitted packet was retried, STEP 1014. If it was, no adjustment is made to the threshold value. If there is evidence of consecutive packets being accepted, STEP 1014, the threshold value is decremented unless already at the lowest value, STEP 1018.

It should be noted that if there is at least one packet available, the Arbiter 66a, 66b always presents a packet to the Output Sequencer 71, even if said packet does not meet the priority threshold value criterion. Transmission of packets that do not meet the threshold criterion is necessary for receiver based flow control, and optional for initiator based flow control.

FIG. 11 shows the selection process employed by the Output Sequencer 71 to choose the next information packet to be transmitted to the I/O Output Port 80 from the packets presented by the plurality of pairs of Arbiters 66a, 66b. While there is a packet in transition from the Input Buffers 64 to the Output FIFO 73, the next packet is not selected, STEP 1100. When there are no packets being transferred to the Output FIFO 73, or at the completion of a packet transfer, the Output Sequencer 71 checks if one or more subsequent packets are available for transfer, STEP 1102. If no packets are being presented, the Output Sequencer 71 will monitor Arbiter 66a, 66b communications awaiting the arrival of new packets. When one or more packets are presented, the Output Sequencer 71 determines if any of the presented packets meet the threshold criteria, STEP 1104. If not, the Output Sequencer 71 will select the oldest packet from the subset of available packets having the highest priority value, STEP 1106. If on the other hand there are available packets that meet the threshold criteria, the Output Sequencer 71 will proceed to determine, based on an explicit understanding of the requirements of the quality of service classes coupled with the selection history of previous transmitted packets from that I/O Output Port 80, the appropriate packet class that should be transmitted next, STEP 1108. In this embodiment, class 1 packets are understood to have low latency attributes, this being the primary consideration. Thus class 1 packets meeting the threshold criteria will always be selected before any class 2 packets. The Output Sequencer 71, once it has determined the appropriate quality of service class that should be transmitted next, will check if there are any packets presented of that class, STEP 1109. If not, the Output Sequencer 71 will proceed to select the oldest packet from those in the other class that meets the threshold criteria, STEP 1114. If it is determined in STEP 1109 that there are indeed packets of the desired class, the Output Sequencer 71 determines if any of those packets meet the threshold criteria, STEP 1110. If there is one or more packets of that class that meet the criteria, the Output Sequencer 71 will select the oldest of those packets, STEP 1112. If none of the packets of that class meet the criteria, then the oldest packet from those presented of the other class that meet the threshold criteria is selected, STEP 1114. Once the next packet to be transferred has been chosen, the Output Sequencer 71 will select the appropriate path through the Output Multiplexer 72, STEP 1115. After the packet selection process is complete, the Output Sequencer 71 requests of the Arbiter 66a, 66b presenting the selected packet to send the packet, stores said packet in the Output FIFO 73, and notifies the Output Control 76 that the packet is ready for transmission, STEP 1116. The Output Sequencer then proceeds to start the selection process for the next packet for transmission, returning to Step 1110.

Referring now to FIG. 12, the input flow control is managed by the Input Decoder 62. The Input Decoder 62 sends a credit count to the associated Output Control 76 via the dedicated communication path 63, STEP 1202. If the attached information packet controller is operating in initiator flow control mode, the credit count will be transmitted as a credit flow control packet. If the attached information packet controller is operating in target flow control mode, the Output Control 76 does not act on this information; rather it relies on the Input Decoder 62 to issue Retry commands to the Output Control 76 in support of buffer availability flow control. Once the current credit value has been established, STEP 1202, the Input Decoder 62 will note the buffer entry usage to determine changes in the number of buffers available, STEPS 1204 and 1208. Buffers that are newly allocated, STEP 1204 will result in a reduction of the available credit, STEP 1206, while buffers that are no longer in use, i.e. freed up, will result in an increase of available credit, STEP 1210. Determination of net change in the credit count, STEP 1212, will result in the issuance of a credit count update to the Output Control 76, STEP 1202.

Figure 5:
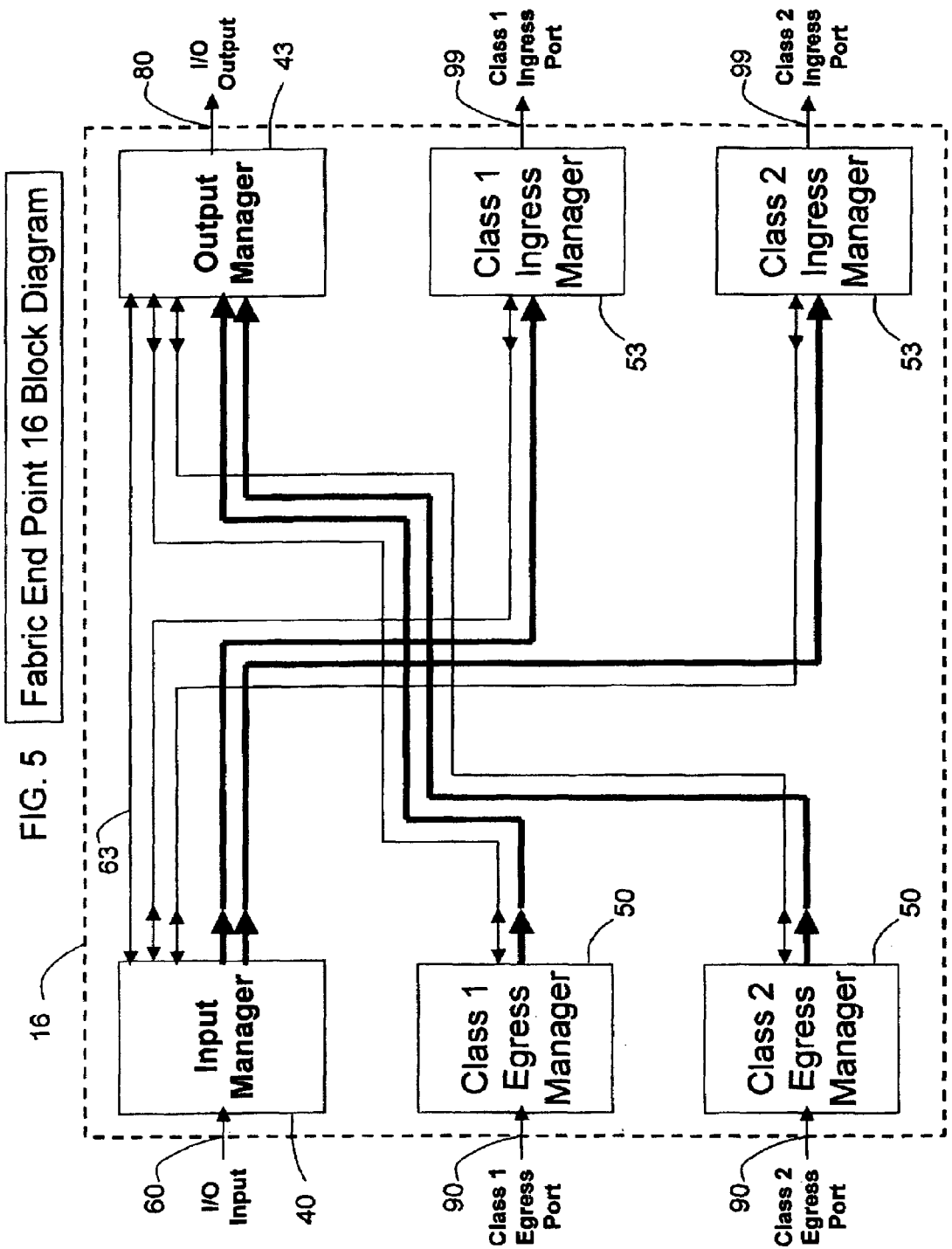
FIG. 5 is a block diagram of an exemplary one of the fabric end points of FIG. 2.

Referring now to FIG. 5, the fabric end point 16 includes, as noted above, components in common with the fabric switch unit, specifically the Input Manager 40 and the Output Manager 43 in support of the fabric I/O attach input and output port. The fabric end point 16 also includes components dedicated to interface to the fabric nodes 12, specifically the Egress Managers 50 and the Ingress Managers 53. Egress Managers control the transmission of packets from the fabric nodes 12 into the packet switching network 14, while Ingress Managers control the receipt of packets from the fabric to the fabric nodes 12.

More particularly, the Input Manager 40 of end point 16 has an I/O port 60 connected to the I/O port 80 of a switching unit 14*a*, as shown in FIG. 2. The class 1 Egress Manager 50 has a class 1 egress port connected to the CONTROL INTERFACE 20 of node 12, as shown in FIGS. 1 and 2 at port 90. The class 2 Egress Manager 50 has a class 2 egress port connected to the DATA INTERFACE 18 of node 12, as shown in FIGS. 1 and 2 at port 90. The Output Manager 43 is fed by Control and Data packets from the class 1 and class 2 Egress Managers 50, respectively, as shown in FIG. 5. The Output Manager 43 of the end point 16 is connected to I/O port 80 of the end point 16 and is connected to the I/O port 60 of switching unit 14*a*, as shown in FIG. 4. Class 1 and class 2 Ingress Managers 53 are fed signals and packets from the Input Manager 40 and provide Control and Data packets at port 99, FIG. 2.

Figure 6:
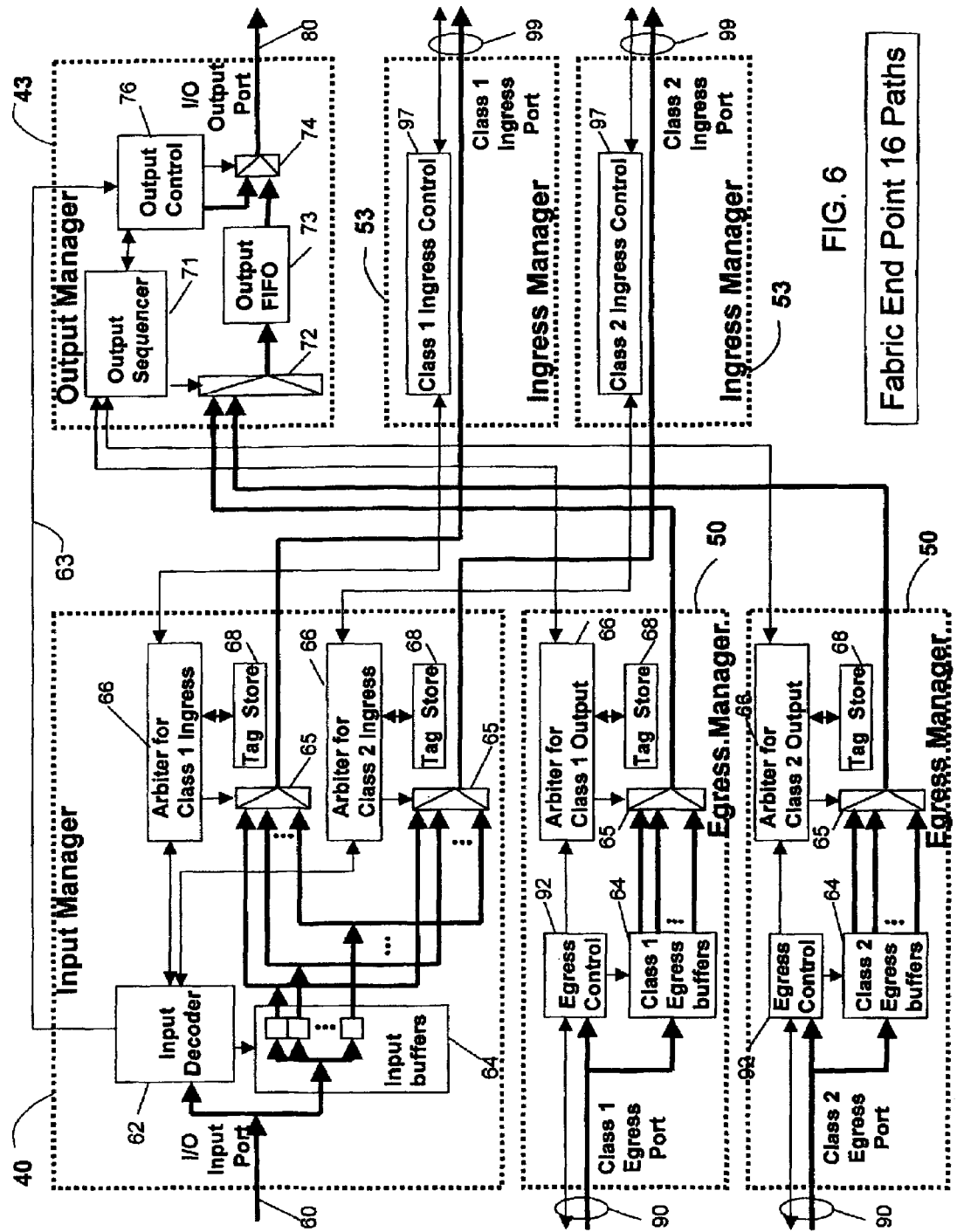
FIG. 6 is a block diagram of the exemplary one of the fabric end points of FIG. 5, such diagram showing packet and internal communications paths within said end point.

Referring now to FIG. 6, the fabric end point 16 is shown in more detail. It is noted that the Egress Manager 50 includes an Egress Control 92, which performs a similar but slightly different function than the fabric switch unit's Input Decoder 62. The Egress Control 92 controls an Egress Buffer 64 which provides the same functions as the fabric switch unit Input Buffers 64. There is a pair of attached Arbiters 66*a*, 66*b* that perform in like manner to the Arbiter 66*a*, 66*b* contained in the fabric switch unit 14*a*, as does the Tag Store 68.

Referring now to FIG. 13, the Egress Control 92 awaits the arrival of information and flow control packets on the node Egress Port 90, STEP 1302. Upon a packet being received, the Egress Control 92 examines the packet to determine the priority, STEP 1304. The Egress Control 92 then proceeds to ascertain if there is sufficient buffer space available in the Egress Buffers 64, in compliance with the aforementioned buffer allocation by priority, STEP 1306. If there are insufficient buffer entries, the Egress Control 92 notifies the node that the packet was not accepted by issuing a Retry, STEP 1308. If buffer space is available for that priority packet, the Egress Control 92 stores the packet in the Input Buffers 64 and informs the attached Arbiter 66*a*, 66*b* of the packet availability and attributes, STEP 1310. The Egress Control 92 determines if the packet was received in its entirety error free, STEP 1312. If it was received successfully, the Egress Control 92 instructs the node that the packet was accepted via a positive acknowledge for the packet, STEP 1314. If there was an error in packet receipt, the Egress Control 92 frees up the buffer entry and notifies the identified Arbiter that the packet is not valid and not available for transmission, Step 1316. The Egress Control 92 proceeds to instruct the node that the packet was not successfully transmitted via a negative acknowledge for the packet, STEP 1318. The Egress Control 92 returns to waiting for the next packet, STEP 1302.

Referring now to FIG. 14, the process employed by the fabric end point Ingress Control 97 contained within the Ingress Manager 53 to transmit the next information packet to the Ingress Port 99 is shown.

The Ingress Control 97 checks that the Ingress port is available to receive packets, STEP 1402. If it is available, Ingress Control 97 checks if one or more subsequent packets are available for transfer from the attached Arbiter 66*a*, 66*b*, STEP 1404. If no packets are being presented, the Ingress Control 97 will monitor Arbiter 66 communications awaiting the arrival of a new packet. When a packet is being presented, the Ingress Control 97 requests of the attached Arbiter 66*a*, 66*b* presenting the selected packet to send the packet, and transmits said packet out the Ingress port 99 to the node, STEP 1406. If the node indicates the transfer was not successful, STEP 1408, the Ingress Control 97 notifies the attached Arbiter 66*a*, 66*b*, which will consider the packet as available for retransmission, STEP 1410. If the node indicates that the transfer was successful, the Ingress Control 97 notifies the attached Arbiter 66*a*, 66*b*, which will in turn notify the Input Decoder 62 that the packet buffer can be freed up, STEP 1412.

A number of embodiments of the invention have been described. Nevertheless, it will be understood that various modifications may be made without departing from the spirit and scope of the invention. Accordingly, other embodiments are within the scope of the following claims.

What is claimed is:

1. A method for performing arbitration in an information packet controller, comprising:

transmitting different types of information packets from an initiator to a receiver, one type of information packet having a first quality of service class requiring a faster transmission time from the initiator to the receiver than another type of information packet having a second quality of service class having a slower transmission time from the initiator to the receiver, wherein the information packets being transmitted are selected for order of transmission and the packets selected for transmission are then actually transmitted from the initiator to the receiver is in accordance with: a minimum priority threshold value indicating the lowest priority packet to be accepted by such receiver, such value being based on information from such receiver, such information indicating a number of packets available for receipt by such receiver; priority assigned to the information packet; said quality of service class assigned to the information packet; and the age of such information packets having been stored in a queue of the initiator; and wherein packets having the first quality of service class has a plurality of different priorities for use in the selection of the order of those packets to be transmitted to the receiver and the second quality of service class has a plurality of different priorities for use in the selection of the order of those packets to be transmitted to the receiver.

2. A method for performing arbitration in an initiator information packet controller, comprising:

storing information packets in an input queue of the initiator and indicating a relative age among such stored packet;

assigning to each one of the packets a priority;

assigning to each one of the packets a quality of service class, each one of the quality of service classes having a plurality of different priorities for use in the selection of the order of those packets to be transmitted to a receiver, such quality of service class being a function of the relative speed at which the packet is required to pass from the initiator to the receiver;

establishing in the initiator a minimum priority threshold value indicating the lowest priority packet to be accepted by such receiver, such value being based on information from such receiver, such information indicating a number of packets available for receipt by such receiver; and wherein information packets being transmitted are selected for order of transmission and are then actually transmitted to the receiver as a function of the threshold value, priority, quality of service class and relative age.

3. The method recited in claim 2 wherein the quality of service is a function of the speed at which the packets are required to pass from the initiator to the receiver.

4. An information packet controller, comprising:
   an output port;
   a packet flow manager for arbitrating for transmission of information packets to the output port in accordance with such arbitrating, such manager determining the order of: transmitting of information packets to be transmitted from the output of an information packet controller to a receiver are selected for order of transmission and are then actually transmitted in accordance with: a minimum priority threshold value; a priority assigned to the information packet; a class assigned to the information packet, such quality of service class being a function of the relative speed at which the packet is required to pass from the initiator to the receiver and, the age of such information packets that have been stored in one or more queues of the information packet controller, and wherein, each one of the quality of service classes having a plurality of different priorities for use in the selection of the order of those packets to be transmitted to the receiver.

5. An information packet controller, comprising:
   an output port;
   a packet flow manager to arbitrate for transmission of information packets to the output port in accordance with such arbitration, such arbitration comprising:
      storing information packets in an input queue of the initiator and indicating a relative age among such stored packet;
      assigning to each one of the packets a priority;
      assigning to each one of the packets a quality of service class, such quality of service class being a function of the speed at which the packets are required to pass from the initiator to a receiver, each one of the quality of service classes having a plurality of different priorities for use in the selection of the order of those packets in such quality of service class are to be transmitted to the receiver;
      establishing in the initiator a minimum priority threshold value indicating the lowest priority packet to be accepted by such receiver, such value being based on information from such receiver, such information indicating a number of packets available for receipt by such receiver;
      selecting for order of transmission and then actually transmitting the selected packets to the receiver as a function of the threshold value, priority for transmission to the receiver, quality of service class and relative age.

6. An information packet controller, comprising:
   an output port;
   a packet flow manager to arbitrate for transmission of information packets to the output port in accordance with such arbitration, such arbitration comprising:
      storing information packets in an input queue of an initiator and indicating a relative age among such stored packet;
      assigning to each one of the packets a priority;
      assigning to each one of the packets a quality of service class, such quality of service class being a function of the speed at which the packets are required to pass from the initiator to a receiver, each one of the quality of service classes having a plurality of different priorities for use in the selection of the order of those packets to be transmitted to the receiver;
      establishing in the initiator a minimum priority threshold value indicating the lowest priority packet to be accepted by such receiver, such value being inferred based on retry commands sent by the receiver in response to prior information packets sent by the initiator;
      selecting for order of transmission and then actually transmitting the selected packets to the receiver as a function of the threshold value, priority, quality of service class and relative age.

7. A method for transmitting different quality of service classes of information packets through the packet switching network, one of the quality of service classes of the information packets requiring a different degree of latency than another one of the quality of service classes of the information packets;
   assigning each one of the quality of service classes a plurality of different priorities;
   determining a minimum threshold, such threshold being related to the lowest priority a packet that can be expected to be accepted by a receiver, such threshold being determined on the basis of the priority and independent of the quality of service class of the packet;
   selecting for order of transmission and then actually transmitting the selected packet from a transmitting queue storing the packets is selected from all possible candidate packets within the queue meeting the minimum threshold indicating the lowest priority packet to be accepted by such receiver, threshold being inferred based on retry commands sent by the receiver in response to prior information transmitted packets with a final selection of the packet being determined independent of priority and with the final selection of the packet being made based on the quality of service class of the candidate packets for use in the selection of the order of those packets to be transmitted to the receiver, followed by the age of such one of the packets within the selected quality of service class.

8. A method for performing arbitration in an information packet controller, comprising:
   transmitting different types of information packets from an initiator to a receiver, one type of information packet having a first quality of service class requiring a faster transmission time from the initiator to the receiver than another type of information packet having a second quality of service class having a slower transmission time from the initiator to the receiver, wherein the transmitting of the information packets are selected for transmission and the packets selected for transmission are then actually transmitted from the initiator to the receiver is in accordance with the following sequence:
   Determine threshold value, as notified from the receiver;
   Select only those packets that meet or exceed the minimum priority threshold value, independent of class or age;
   If there are one or more packets of the low latency class, independent of priority or age, narrow the selection to only include those packets; and from the remainder, select the packet that is the oldest; and
   wherein the first quality of service class has a plurality of different priorities for use in the selection of the order of those packets having the first quality of service class are to be transmitted to the receiver and the second quality of service class has a plurality of different priorities for use in the selection of the order of those packets having the second quality of service class are to be transmitted to the receiver.

9. A method for performing arbitration in an initiator information packet controller, comprising:
- storing information packets in an input queue of the initiator and indicating a relative age among such stored packet;
- assigning to each one of the packets a priority;
- assigning to each one of the packets a quality of service class, each one of the quality of service classes having a plurality of different priorities, such quality of service class being a function of the relative speed at which the packet is required to pass from the initiator to a receiver;
- establishing in the initiator a minimum priority threshold value indicating the lowest priority packet to be accepted by such receiver, such value being based on information from such receiver, such information indicating a number of packets available for receipt by such receiver; and
- wherein information packets being transmitted are selected for order of transmission and are then actually transmitted to the receiver as a function of the threshold value, priority, quality of service class and relative age.

10. The method recited in claim 9 wherein the quality of service is a function of the speed at which the packets are required to pass from the initiator to the receiver.

11. An information packet controller, comprising:
- an output port;
- a packet flow manager for arbitrating for transmission of information packets to the output port in accordance with such arbitrating, such manager determining the order of: transmitting of information packets to be transmitted from the output of an information packet controller to a receiver are selected for order of transmission and are then actually transmitted in accordance with: a minimum priority threshold value; a priority assigned to the information packet; a class assigned to the information packet, such quality of service class being a function of the relative speed at which the packet is required to pass from the initiator to the receiver and, the age of such information packets that have been stored in one or more queues of the information packet controller, and wherein, each one of the quality of service classes having a plurality of different priorities.

12. An information packet controller, comprising:
- an output port;
- a packet flow manager to arbitrate for transmission of information packets to the output port in accordance with such arbitration, such arbitration comprising:
  - storing information packets in an input queue of the initiator and indicating a relative age among such stored packet;
  - assigning to each one of the packets a priority;
  - assigning to each one of the packets a quality of service class, such quality of service class being a function of the speed at which the packets are required to pass from the initiator to a receiver, each one of the quality of service classes having a plurality of different priorities;
  - establishing in the initiator a minimum priority threshold value indicating the lowest priority packet to be accepted by such receiver, such value being based on information from such receiver, such information indicating a number of packets available for receipt by such receiver;
  - selecting for order of transmission and then actually transmitting all the selected packets to the receiver as a function of the threshold value, priority, quality of service class and relative age.

13. An information packet controller, comprising:
- an output port;
- a packet flow manager to arbitrate for transmission of information packets to the output port in accordance with such arbitration, such arbitration comprising:
  - storing information packets in an input queue of an initiator and indicating a relative age among such stored packet;
  - assigning to each one of the packets a priority;
  - assigning to each one of the packets a quality of service class, such quality of service class being a function of the speed at which the packets are required to pass from the initiator to a receiver, each one of the quality of service classes having a plurality of different priorities;
  - establishing in the initiator a minimum priority threshold value indicating the lowest priority packet to be accepted by such receiver, such value being inferred based on retry commands sent by the receiver in response to prior information packets sent by the initiator;
  - selecting for order of transmission and then actually transmitting all the selected packets to the receiver as a function of the threshold value, priority, quality of service class and relative age.

14. A method for transmitting different quality of service classes of information packets through the packet switching network, one of the quality of service classes of the information packets requiring a different degree of latency than another one of the quality of service classes of the information packets;
- assigning each one of the quality of service classes a plurality of different priorities;
- determining a minimum threshold, such threshold being related to the lowest priority a packet that can be expected to be accepted by a receiver, such threshold being determined on the basis of the priority and independent of the quality of service class of the packet;
- selecting for order of transmission and then actually transmitting all the selected packet from a transmitting queue storing the packets is selected from all possible candidate packets within the queue meeting the minimum threshold indicating the lowest priority packet to be accepted by such receiver, threshold being inferred based on retry commands sent by the receiver in response to prior information transmitted packets with a final selection of the packet being determined independent of priority and with the final selection of the packet being made based on the quality of service class of the candidate packets, followed by the age of such one of the packets within the selected quality of service class.

15. A method for performing arbitration in an information packet controller, comprising:
- transmitting different types of information packets from an initiator to a receiver, one type of information packet having a first quality of service class requiring a faster transmission time from the initiator to the receiver than another type of information packet having a second quality of service class having a slower transmission time from the initiator to the receiver, wherein the transmitting of the information packets are selected for transmission and the packets selected for transmission are then all actually transmitted from the initiator to the receiver is in accordance with the following sequence:
  - Determine threshold value, as notified from the receiver;

Select only those packets that meet or exceed the minimum priority threshold value, independent of class or age;

If there are one or more packets of the low latency class, independent of priority or age, narrow the selection to only include those packets; and from the remainder, select the packet that is the oldest; and wherein the first quality of service class has a plurality of different priorities and the second quality of service class has a plurality of different priorities.

* * * * *